United States Patent [19]
King et al.

[11] Patent Number: 6,030,918
[45] Date of Patent: Feb. 29, 2000

[54] GALLIUM BASED LOW-INTERACTION ANIONS

[75] Inventors: Wayne A. King; Gregory J. Kubas, both of Santa Fe, N. Mex.

[73] Assignee: The Regents of the University of California, Los Alamos, N. Mex.

[21] Appl. No.: 09/219,474

[22] Filed: Dec. 23, 1998

Related U.S. Application Data

[62] Division of application No. 08/882,634, Jun. 25, 1997, abandoned.

[51] Int. Cl.$^7$ .............................. B01J 31/20; B01J 31/12
[52] U.S. Cl. ......................... 502/152; 502/231; 526/160; 526/163; 556/28
[58] Field of Search .................................. 502/152, 231; 556/28; 526/160, 163

[56] References Cited

U.S. PATENT DOCUMENTS

| | | | |
|---|---|---|---|
| 5,099,048 | 3/1992 | Brookhart et al. | 556/136 |
| 5,318,935 | 6/1994 | Canich et al. | 502/117 |
| 5,350,723 | 9/1994 | Neithamer et al. | 502/104 |
| 5,384,299 | 1/1995 | Turner et al. | 502/155 |
| 5,387,568 | 2/1995 | Ewen et al. | 502/104 |
| 5,434,116 | 7/1995 | Sone et al. | 502/103 |
| 5,474,962 | 12/1995 | Takahashi et al. | 502/129 |
| 5,489,659 | 2/1996 | Sugano et al. | 526/127 |
| 5,498,582 | 3/1996 | Krause et al. | 502/103 |
| 5,502,017 | 3/1996 | Marks et al. | 502/103 |
| 5,510,502 | 4/1996 | Sugano et al. | 556/11 |
| 5,516,739 | 5/1996 | Barborak et al. | 502/161 |
| 5,561,216 | 10/1996 | Barborak et al. | 528/392 |
| 5,571,885 | 11/1996 | Chung et al. | 526/348 |
| 5,578,690 | 11/1996 | Marks et al. | 526/347 |
| 5,599,761 | 2/1997 | Turner | 502/152 |
| 5,623,022 | 4/1997 | Sugano et al. | 525/247 |

OTHER PUBLICATIONS

You–Xian Chen et al., J. Am. Chem. Soc, 1997, vol. 119, No. 10, pp. 2582–2583.
Karl Ludovici et al., J. Organometallic Chemistry, vol. 441, 1992, pp. 363–371.
L. Wilson et al., J. Organometallic Chemistry, 1974, vol. 67, pp. 229–235.

*Primary Examiner*—David W. Wu
*Assistant Examiner*—Caixia Lu-Rutt
*Attorney, Agent, or Firm*—Bruce H. Cottrell

[57] ABSTRACT

The present invention provides: a composition of the formula $M^{+x}(Ga(Y)_4^-)_x$ where M is a metal selected from the group consisting of lithium, sodium, potassium, cesium, calcium, strontium, thallium, and silver, x is an integer selected from the group consisting of 1 or 2, each Y is a ligand selected from the group consisting of aryl, alkyl, hydride and halide with the proviso that at least one Y is a ligand selected from the group consisting of aryl, alkyl and halide; a composition of the formula $(R)_x Q^+ Ga(Y)_4^-$ where Q is selected from the group consisting of carbon, nitrogen, sulfur, phosphorus and oxygen, each R is a ligand selected from the group consisting of alkyl, aryl, and hydrogen, x is an integer selected from the group consisting of 3 and 4 depending upon Q, and each Y is a ligand selected from the group consisting of aryl, alkyl, hydride and halide with the proviso that at least one Y is a ligand selected from the group consisting of aryl, alkyl and halide; an ionic polymerization catalyst composition including an active cationic portion and a gallium based weakly coordinating anion; and bridged anion species of the formula $M^{+x}_y[X(Ga(Y_3)_z]^{-y}_x$ where M is a metal selected from the group consisting of lithium, sodium, potassium, magnesium, cesium, calcium, strontium, thallium, and silver, x is an integer selected from the group consisting of 1 or 2, X is a bridging group between two gallium atoms, y is an integer selected from the group consisting 1 and 2, z is an integer of at least 2, each Y is a ligand selected from the group consisting of aryl, alkyl, hydride and halide with the proviso that at least one Y is a ligand selected from the group consisting of aryl, alkyl and halide.

1 Claim, No Drawings

6,030,918

GALLIUM BASED LOW-INTERACTION ANIONS

This application is a Divisional and claims the benefit of U.S. patent application Ser. No. 08/882,634, filed Jun. 25, 1997 now abandoned.

This invention is the result of a contract with the Department of Energy (Contract No. W-7405-ENG-36).

FIELD OF THE INVENTION

The present invention relates to weak coordinating anions useful with metallocene catalysts.

BACKGROUND OF THE INVENTION

The development of homogeneous olefin polymerization catalysts has been greatly advanced by the development of reactive cationic transition metal complexes of the type $Cp_2MR^+X^-$ (Cp being a cyclopentadienyl-type ligand; M being a Group IVB metal such as titanium, zirconium, or hafnium; R being alkyl, aryl or halide; and X being a weakly coordinating anion). Previously, weakly coordinating anions such as $B(C_6H_3(3,5CF_3)_2)_4$, $B(C_6F_5)_4$, $RB(C_6F_5)_3$, $B(C_6F_4(4,Si(CH_3)_3))_4$, and $B(C_6F_4(4,Si(t-butyl)_3))_4$. Other such anions are described by Marks et al. in U.S. Pat. No. 5,502,017. Such anions are classified as low interacting anions due to their large size, their ability to spread negative charge over their surfaces and their inert chemical properties. These properties generally decrease the electrostatic attractions between the $Cp_2MR^+$ fragment and the anion thus allowing substrates such as olefins to compete favorably for a binding site on the $Cp_2MR^+$ fragment. Once such a substrate binds, it reacts with the alkyl group bound to the metal yielding a new longer alkyl chain.

Despite the success of polymerization catalysts of the type $Cp_2MR^+X^-$, further developments including improvements of the weakly coordinating anion have been continually sought. Larger anions are one desired development. Additionally, preparation of the anion should not be a complex multiple step process.

Ludovici et al. describe the synthesis of various pentafluorophenyl gallium derivatives in Journal of Organometallic Chemistry, vol. 441, pp. 363–371 (1992). While preparation of a tetrakis(pentafluorophenyl) gallate species is described, namely tetrabutylammonium tetrakis (pentafluorophenyl) gallate, there is no suggestion of using gallate species in catalysis and the exemplified species would not be suitable in the preparation of trityl catalysts.

It is an object of the present invention to provide a non-boron based salt suitable for preparation of catalysts including a non-boron salt based on gallium, e.g., a trityl based catalyst.

It is a further object of the invention to provide a one step process for preparation of the gallium based salts.

A still further object of the present invention is to provide bridged anionic species including at least two metal atoms such as gallium.

Yet another object of the present invention is to provide organoalumoxane-free ionic polymerization catalyst compositions.

SUMMARY OF THE INVENTION

To achieve the foregoing and other objects, and in accordance with the purposes of the present invention, as embodied and broadly described herein, the present invention provides a composition of the formula $M^{+x}(Ga(Y)_4^-)_x$ where M is a metal selected from the group consisting of lithium, sodium, potassium, cesium, calcium, strontium, thallium, and silver, x is an integer selected from the group consisting of 1 or 2, each Y is a ligand selected from the group consisting of aryl, alkyl, hydride and halide with the proviso that at least one Y is a ligand selected from the group consisting of aryl, alkyl and halide.

The present invention further provides a composition of the formula $(R)^x Q^+ Ga(Y)_4^-$ where Q is selected from the group consisting of carbon, nitrogen, sulfur, phosphorus and oxygen, each R is a ligand selected from the group consisting of alkyl, aryl, and hydrogen, x is an integer selected from the group consisting of 3 and 4 depending upon Q, and each Y is a ligand selected from the group consisting of aryl, alkyl, hydride and halide with the proviso that at least one Y is a ligand selected from the group consisting of aryl, alkyl and halide.

Still further the present invention provides an ionic polymerization catalyst composition comprising an active cationic portion and a gallium based weakly coordinating anion. The composition can be organoalumoxane-free. The active cationic portion of the catalyst can be, e.g., a cation including a cyclopentadienyl ligand, a Group IVB transition metal, and alkyl, aryl, or hydride substituents, a cation including a Group VIII metal such as cobalt, nickel, palladium or platinum and the like, either a pair of two electron donor ligands or a bidentate four electron donor ligand, alkyl, aryl or acyl substituents, and either a CO ligand or a ligand capable of displacement by CO. In a preferred embodiment the weakly coordinating anion is $Ga(C_6F_5)_4^-$.

Still further the present invention provides a process of preparing $Li^+Ga(C_6F_5)_4^-$ including admixing gallium trichloride and lithium pentafluorobenzene in a suitable solvent at temperatures and for time sufficient to form said $Li^+Ga(C_6F_5)_4^-$.

Still further the present invention provides bridged anion species of the formula $M^{+x}_y[X(Ga(Y)_3)_2]^{-y}_x$ where M is a metal selected from the group consisting of lithium, sodium, potassium, magnesium, cesium, calcium, strontium, thallium, and silver, x is an integer selected from the group consisting of 1 or 2, X is a bridging group between two gallium atoms, y is an integer selected from the group consisting 1 and 2, z is an integer of at least 2, each Y is a ligand selected from the group consisting of aryl, alkyl, hydride and halide with the proviso that at least one Y is a ligand selected from the group consisting of aryl, alkyl and halide.

DETAILED DESCRIPTION

The present invention is concerned with a gallium based anion, such an anion capable of serving as a weakly coordinating anion, e.g., in metallocene cationic salts such as $Cp_2MR^+X^-$, and with catalyst compositions including such a gallium based anion. In one embodiment, the present invention is concerned with bridged anion species including at least two gallium atoms and having a charge of at least minus one.

One gallium based composition or gallium salt of the present invention is of the general formula $M^{+x}(Ga(Y)_4^-)_x$. M represents a metal ion from the group of lithium, sodium, potassium, cesium, calcium, strontium, thallium, or silver. The valance charge of the metal ion is represented by x, which is generally 1 or 2. Y represents the ligands bound to the gallium atom with each ligand independently selected from among aryl groups, alkyl groups, hydride and halide groups with the proviso that at least one Y is a ligand selected from the group consisting of aryl, alkyl and halide. A variety of gallium tetraalkyl structures, gallium tetraaryl structures, and gallium tetrahalide structures, as well as gallium trihydride structures are contemplated in accordance with the present invention. Mixed structures including combinations of alkyl, aryl, and halide groups may be used as well. The alkyl groups generally include any $C_1$ to $C_{20}$ alkyl which can be linear, branched, or cyclic, e.g., methyl, ethyl, propyl, isopropyl, butyl, isobutyl, tertiary butyl, pentyl, hexyl, cyclohexyl, and the like, preferably perfluorinated alkyl groups. The aryl groups generally include phenyl, substituted phenyl, e.g., partially or fully substituted with fluorine atoms, biphenyl, substituted biphenyl, naphthyl, substituted naphthyl and the like, preferably a perfluorinated aryl group. The halide groups include fluoride, chloride, bromide, or iodide, preferably fluoride.

Another gallium based composition or gallium salt of the present invention can include a bridged anion species with the general formula $M^{+x}_y[X(Ga(Y_3)_2]^{-y}_x$. M generally represents a metal ion from the group of lithium, sodium, potassium, magnesium, cesium, calcium, strontium, thallium, or silver, although other metals may also be suitable. The valance charge of the metal ion is represented by x, which is generally 1 or 2, while y is an integer selected from the group consisting −1 and −2, and z is an integer of at least 2 X can be chosen from among halide atoms, an acetylide group, a furandiyl group, a methylpyrrolediyl group, a ferrocenediyl group, a ruthenocenediyl group, a biphenylylene group, an oxydiphenylene group, an alkadiene group, an alkanediyl, an arylene group, an alkoxy group, a thioxy group, a cyano group, a pyridine group, an amine group, and a phosphine group. Where X is a halide atom, it is preferably a chlorine atom. Y represents the ligands bound to the gallium atom with each ligand independently selected from among aryl groups, alkyl groups, hydride and halide groups with the proviso that at least one Y is a ligand selected from the group consisting of aryl, alkyl and halide. Mixed structures including combinations of alkyl, aryl, and halide groups may be used as well. The valance charge of the anion is represented by −y, with y being generally at least 1, although it may be greater than that also, e.g., 2, such that the valence charge on the anion is, e.g., −1 or −2. The alkyl groups generally include any $C_1$ to $C_{20}$ alkyl group which can be linear, branched, or cyclic, e.g., methyl, ethyl, propyl, isopropyl, butyl, isobutyl, tertiary butyl, pentyl, hexyl, cyclohexyl, and the like, preferably perfluorinated alkyl groups. The aryl groups generally include phenyl, substituted phenyl, e.g., phenyl either partially or fully substituted with fluorine atoms, biphenyl, substituted biphenyl, e.g., biphenyl either partially or fully substituted with fluorine atoms, naphthyl, substituted naphthyl, e.g., naphthyl either partially or fully substituted with fluorine atoms, and the like, preferably a perfluorinated aryl group. The halide groups include fluoride, chloride, bromide, or iodide, preferably fluoride.

The bridged anion species with the general formula $M^{+x}_y[x(Ga(Y)_3)_2]^{-y}_x$ may be prepared according to the process described by Wilson et al. in Journal of Organometallic Chemistry, v. 67, pp. 229–235 (1974). Using such a process bridged anion species may be incorporating such bridging group precursors including dilithium compounds such as μ-2,4-dicarbaheptaborane(7)-2,4-diyldilithium, μ-1,2-dicarbadodecaborane(12)-1,2-diyldilithium, μ-1,7-dicarbadodecaborane(12)-1,7-diyldilithium, μ-1,12-dicarbadodecaborane(12)-1,12-diyldilithium, dilithioethyne (dilithium acetylide), μ-1,2-dilithioallene (dilithiopropadiene), 2,5-dilithiofuran (2,5-furandiyldilithium), 1,4-dilithiobutane (μ-1,4-butanediyldiyldilithium), 2,4-dilithio-1-methylpyrrole (μ-(1-methyl-1H-pyrrole-2,4-diyl)dilithium), 1,5-dilithiopentane (μ-1,5-pentanediyldiyldilithium), 1,2-dilithiobenzene (μ-1,2-phenylenedilithium), 1,1'-dilithioferrocene (μ-1,1'-ferrocenediyldilithium), 1,1'-dilithioruthenocene (μ-1,1'-ruthenocenediyldilithium), 2,2'-dilithiobiphenyl (μ-2,2'-biphenylylenedilithium), 4,4'-dilithiobiphenyl (μ-[1,1'-Biphenyl]-4,4'-dilithium), 2,2'-dilithiodiphenyl ether ([μ-(Oxydi-2,1-phenylene)]dilithium), 2,2'-dilithio-6,6'-dimethylbiphenyl, and 1,4-dilithio-1,2,3,4-tetraphenyl-1,3-butadiene ([μ-(1,2,3,4-tetraphenyl-1,3-butadiene-1,4-diyl)]dilithium. Generally, such bridging group precursors may include halide atoms, an acetylide group, a furandiyl group, a methylpyrrolediyl group, a ferrocenediyl group, a ruthenocenediyl group, a biphenylylene group, an oxydiphenylene group, an alkadiene group, an alkanediyl, or an arylene group, or may include a bridging atom from, e.g., an alkoxy group, a thioxy group, a cyano group, a pyridine group, an amine group, and a phosphine group. The bridge can be a single atom such as a halide atom or, e.g., an oxygen atom in a alkoxy group, or the bridge can be more than one atom such as a cyano group, the nitrogen and carbon atoms of a pyridine group, the carbon atoms of an alkane group and the like. The charge on the bridged anion species can be −1 or may be other than −1, such as −2. In some instances the charge on the bridged anion species may be greater than 2 where the gallium atom is replaced by other species such as a boron atom, an aluminum atom or a thallium atom.

In another equivalent manner of viewing the bridged composition, the $X(Ga(Y_3)_2)$ anionic portion could be considered as a $Ga(Y_3Y')$ anion where $Y'$ is a $X—Ga(Y_3)$ group.

It has been found that in the preparation of the $Ga(C_6F_5)_4^-$ anion, the lithium salt of such a gallium based anion can be prepared in a single step by reaction of gallium trichloride with lithium pentafluorobenzene. Other gallium trihalides may be used as well. This reaction is conducted in a suitable solvent, preferably an alkane, and most preferably hexane. Other metal salts of the gallium based anion may be prepared in a similar fashion or by exchange of the lithium with a suitable metal salt.

The present invention further provides for reaction of gallium based compositions or gallium salts of the general formula $M^{+x}(Ga(Y)_4^-)_x$, where M generally represents a metal ion from the group of lithium, sodium, potassium, cesium, magnesium, calcium, strontium, thallium, or silver although other metals may also be suitable, x represents the valance charge of the metal ion, which is generally 1 or 2, and Y represents the ligands bound to the gallium atom with each ligand independently selected from among aryl groups, alkyl groups, hydride and halide groups with the proviso that at least one Y is a ligand selected from the group consisting of aryl, alkyl and halide, such reaction of gallium based compositions or gallium salts used to form a composition of the formula $(R)_xQ^+Ga(Y)_4^-$ where Q is selected from the group consisting of carbon, nitrogen, sulfur, phosphorus and oxygen, each R is a ligand selected from the group consisting of alkyl, aryl, and hydride, x is an integer selected from the group consisting of 3 and 4 depending upon Q, and each Y is a ligand selected from the group consisting of aryl, alkyl, hydride and halide with the proviso that at least one Y is a ligand selected from the group consisting of aryl, alkyl and halide. In preparation of such gallium based compositions of the formula $(R)_xQ^+Ga(Y)_4^-$, a metal salt of the gallium based anion can be reacted with a carbenium ion precursor, an oxonium ion precursor, an ammonium ion precursor, a sulfonium ion precursor or a phosphonium ion precursor. Among carbenium ion precursors are compounds of the general formula RR'R"C—X where X is a halide atom and R, R', and R" are each an aryl compound such as phenyl, a substituted aryl compound such as methoxyphenyl and the like, or an alkyl. Among oxonium ion precursors are compounds of the general formula RR'OR"—X where X is a halide atom, R and R' are each alkyl or aryl, and R" is hydrogen or alkyl. Among ammonium ion precursors are compounds of the general formula $R_4N$—X where X is a halide atom and each R is hydrogen, an aryl compound such as phenyl, a substituted aryl compound such as methoxyphenyl and the like, or an alkyl. Among phosphonium ion precursors are compounds of the general formula $R_4P$—X where X is a halide atom and each R is hydrogen, an aryl compound such as phenyl, a substituted aryl compound such as methoxyphenyl and the like, or an alkyl. Among suitable cations are included triphenylcarbonium, diphenylcarbonium, cycloheptatrienium, indenium, triethylammonium, tripropylammonium, tributylammonium, N,N-dimethylanilinium, dipropylammonium, dicyclohexylammonium, triphenylphosphonium, trimethylphosphonium, tri(dimethylphenyl)phosphonium, tri(methylphenyl)phosphonium, triphenyloxonium, and triethyloxonium. A lithium salt of the gallium based anion can be reacted, e.g., with triphenylmethyl chloride to form a triphenyl carbenium gallium based anion composition.

The present invention further provides for reaction of gallium based compositions or gallium salts of the general formula $M^{+x}_y[X(Ga(Y)_3)_2]^{-y}_x$, where M generally represents a metal ion from the group of lithium, sodium, potassium, cesium, magnesium, calcium, strontium, thallium, or silver although other metals may also be suitable, x represents the valance charge of the metal ion, which is generally 1 or 2, y represents the valence charge of the anion which is generally an integer selected from the group consisting 1 and 2, z is an integer of at least 2, X is a bridging group between at least two gallium atoms, and Y represents the ligands bound to the gallium atom with each ligand independently selected from among aryl groups, alkyl groups, hydride and halide groups with the proviso that at least one Y is a ligand selected from the group consisting of aryl, alkyl and halide, such reaction of gallium based compositions or gallium salts used to form a composition of the formula $(R)_xQ^+Ga(Y)_4^-$ where Q is selected from the group consisting of carbon, nitrogen, sulfur, phosphorus and oxygen, each R is a ligand selected from the group consisting of alkyl, aryl, and hydride, x is an integer selected from the group consisting of 3 and 4 depending upon Q, and each Y is a ligand selected from the group consisting of aryl, alkyl, hydride and halide with the proviso that at least one Y is a ligand selected from the group consisting of aryl, alkyl and halide. In preparation of such gallium based compositions of the formula $(R)_xQ^+Ga(Y)_4^-$, a metal salt of the gallium based anion can be reacted with a carbenium ion precursor, an oxonium ion precursor, an ammonium ion precursor, a sulfonium ion precursor or a phosphonium ion precursor.

The resultant gallium based compositions or gallium salts of the general formulae $M^{+x}(Ga(Y)_4^-)_x$ or $M^{+x}_y[X(Ga(Y)_3)_2]^{-y}_x$ can then be reacted with, e.g., any suitable metallocene reagent, to form a catalyst composition for polymerization of olefins and the like. The resultant gallium based compositions or gallium salts of the general formula $M^{+x}(Ga(Y)_4^-)_x$ can also be reacted with, e.g., any suitable $Cp_2MRX$ reagent where X is halide, triflate or alkoxide, to form a catalyst composition for polymerization of olefins and the like.

Suitable metallocene compounds include bis(cyclopentadienyl)metal hydridohalides, bis(cyclopentadienyl)metal monoalkyl monohalides, bis(cyclopentadienyl)metal dialkyls, bis(indenyl)metal monoalkylmonohalides wherein the metal is zirconium, titanium or hafnium, the halide groups are preferably chlorine and the alkyl groups are preferably $C_1$–$C_6$ alkyls. Illustrative, but non-limiting, examples of metallocenes include bis(cyclopentadienyl)zirconium methylchloride, bis(cyclopentadienyl)zirconium hydridochloride, bis(cyclopentadienyl)hafnium methylchloride, bis(cyclopentadienyl)hafnium hydridochloride, bis(cyclopentadienyl)zirconium dimethyl, bis(cyclopentadienyl)hafnium dimethyl, bis(pentamethylcyclopentadienyl)zirconium methylchloride, bis(pentamethylcyclopentadienyl)hafnium methylchloride, bis(pentamethylcyclopentadienyl)zirconium dimethyl, bis(pentamethylcyclopentadienyl)hafnium dimethyl, bis(n-butylcyclopentadienyl)zirconium methylchloride, bis(n-butylcyclopentadienyl)zirconium hydridochloride,bis(n-butylcyclopentadienyl) dimethyl, cyclopentadienylzirconium trichloride, bis(indenyl)zirconium methylchloride, bis(indenyl)zirconium hydridochloride, bis(indenyl)zirconium dimethyl, bis(4,5,6,7-tetrahydro-1-indenyl)zirconium methylchloride, bis(4,5,6,7-tetrahydro-1-indenyl)zirconium hydridochloride, bis(4,5,6,7-tetrahydro-1-indenyl)zirconium dimethyl, ethylene-[bis(4,5,6,7,-tetrahydro-1-indenyl)] zirconium methylchloride, and ethylene-[bis(4,5,6,7,-tetrahydro-1-indenyl)] zirconium dimethyl. In preparation of the catalyst compositions of the present invention, the metallocene compounds can be used as crystalline solids or as solutions in aliphatic or aromatic hydrocarbons.

In one embodiment, the catalyst compositions of the present invention exhibit activity for polymerization of ethylene and higher alpha-olefins. Ethylene polymers, as well as copolymers of ethylene and one or more $C_3$–$C_{10}$ alpha olefins, may be produced in accordance with the invention. Thus, copolymers having two monomeric units are possible as well as terpolymers having three monomeric units. Particular examples of such polymers include ethylene/1-butene copolymers, ethylene/1-hexene copolymers, and ethylene/propylene/diene copolymers. The catalyst compositions of the present invention can be used in the absence of organoalumoxanes to promote polymerization of ethylene and the like. Thus, the catalyst compositions of the present invention can be used and characterized as organoalumoxane-free compositions, yet promote polymerization of ethylene and the like.

Any suitable alpha-olefin polymerization process can be used to polymerize alpha-olefins in the presence of the catalyst compositions of the present invention. Such processes include polymerizations carried out in suspensions, in solutions, or in the gas phase.

Polymerization temperatures can generally be from about $-50°$ C. to about $150°$ C., preferably from about $50°$ C. to about $150°$ C., and most preferably from about $100°$ C. to about $150°$ C.

The present invention is more particularly described in the following examples which are intended as illustrative only, since numerous modifications and variations will be apparent to those skilled in the art.

EXAMPLE 1

The compound, $Li^+Ga(C_6F_5)_4^-$ was prepared as follows under an argon atmosphere. Gallium trichloride ($GaCl_3$)

(4.58 grams, 0.0260 mol) was dissolved in 125 milliliters (ml) of dry hexane scrubbed of olefins. In 500 ml of dry hexane scrubbed of olefins, lithium pentafluorobenzene ($LiC_6F_5$) (0.104 mol) was generated at −78° C. from n-butyl lithium and $C_6BrF_5$. The $GaCl_3$ solution was added slowly to the rapidly stirred suspension of $LiC_6F_5$ at −78° C. The reaction was observed to take place on addition of the $GaCl_3$ solution. The reaction mixture was allowed to slowly warm up to room temperature (about 20° C.) over a period of 16 hours. The hexane was removed from the solution in vacuo. The colorless solids were extracted and filtered with 700 ml of toluene. The toluene was removed in vacuo. The product was crystallized from a methylene chloride solution by the addition of hexane, yielding a colorless precipitate, followed by reduction of volume and cooling to −78° C. The colorless precipitate was isolated from a light yellow supernatant. The product was washed with hexane and dried in vacuo. Yield: 9.511 g (49%).

EXAMPLE 2

A second compound, $Li^+[Cl(Ga(C_6F_5)_3)_2]^-$, was separated from the product mixture of Example 1. The crystal structure of this bridged gallium anion was determined in conjunction with a manganese dihydrogen bis (diphenylphosphonoethane) carbon monoxide cation thereby demonstrating the existence of the bridged gallium anion.

While repetition of the process of Example 1 has not shown production of isolatable quantities the bridged gallium anion, such an anion may be prepared in accordance with the process described by Wilson et al. in Journal of Organometallic Chemistry, v. 67, pp. 229–235 (1974).

EXAMPLE 3

The compound, $(C_6H_5)_3C^+Ga(C_6F_5)_4^-$, was prepared as follows under an argon atmosphere. $Li^+Ga(C_6F_5)_4^-$ (2.303 g, 3.092 mmol) and $Ph_3CCl$ (0.861 g, 3.196 mmol) were dissolved in 210 ml of methylene chloride. The solution became yellow upon addition of solvent. The solution was allowed to stir for one hour. The reaction mixture was filtered through a Celite® filter agent to remove LiCl. The Celite® filter agent was washed of methylene chloride till colorless. The volume was reduced 75% and cooled to −78° C. Hexane was added and the volume of solution reduced until a yellow oil was formed. On slow warming while stirring, the oil solidified as a yellow precipitate. The yellow solid was dried in vacuo. Yield: 1.37 g. A second crop of yellow crystals were obtained by repetition of the above procedure with methylene chloride and hexane. Yield of the second crop: 1.01 g. Total yield: 78%.

EXAMPLE 4

Polymerization of ethylene using a catalyst prepared in situ from the product of example 3 and bis(1,2-dimethylcyclopentadiene) zirconocene dimethyl ($Cp_2ZrMe_2$) was as follows. Toluene, 50 ml, was vacuum transferred from a Na/K alloy on to $Cp_2ZrMe_2$ (0.010 g, $4.0 \times 10^{-3}$ mmol) and placed under an atmosphere of ethylene (0.803 atm). The solution was equilibrated to 22° C. in a water bath. A solution of $(C_6H_5)_3C^+Ga(C_6F_5)_4^-$ (0.51 g, $5.2 \times 10^{-3}$ mmol) in 8.9 ml was made in a Vacuum Atmospheres dry box under a helium atmosphere and loaded into a Hamilton gas-tight syringe. Polymerization was initiated by fast injection of the $(C_6H_5)_3C^+Ga(C_6F_5)_4^-$ into the rapidly stirred $Cp_2ZrMe_2$ solution through a septum. On injection the solution became bright yellow. The run was allowed to proceed for two minutes. White solid polyethylene began to precipitate from the solution. The reaction was stopped by injection of 15 ml of ethanol. On injection of the ethanol, the yellow solution bleached. The reaction solution was removed in vacuo an the resulting polyethylene was collected and washed with acetone until colorless. Polymerization activity was found to be $8.4 \times 10^5$ g polyethylene per mole of catalyst per atmosphere ethylene per hour.

EXAMPLE 5

Preparation of $[(C_6H_5)_3C]^+[GaCl(C_6F_5)_3]^-$ was as follows. $Ga(C_6F_5)_3$ (1.580 g, 2.449 mmols) and $(C_6H_5)_3CCl$ (0.348 g, 1.248 mmols) were combined and allowed to stand in a 100 mL inlet flask for 7 hours under a helium atmosphere in a Vacuum Atmospheres dry box. The mixture became yellow. The flask was then attached to an argon source and purged out. Dichloromethane, 15 mL was added and the solution was allowed to stir for 15 minutes. The product was crystallized by addition of hexane 60 mL to the reaction mixture. The resulting yellow solid was isolated by filtration under an argon atmosphere the dried under high vacuum. Total yield: 84%.

Although the present invention has been described with reference to specific details, it is not intended that such details should be regarded as limitations upon the scope of the invention, except as and to the extent that they are included in the accompanying claims.

What is claimed is:

1. An organoalumoxane-free ionic polymerization catalyst composition comprising a catalyst including an active cationic portion where the cation is a metallocene cation and a gallium based weakly coordinating anion where the anion is $[X(Ga(Y)_3)_2]^{-y}$ where X is a bridging group between two gallium atoms, y is from about −1 to −2, and each Y is a ligand selected from the group consisting of aryl, alkyl, hydride and halide with the proviso that at least one Y is a ligand selected from the group consisting of aryl, alkyl and halide.

* * * * *